Sept. 19, 1967  R. W. BRUNDAGE  3,342,085

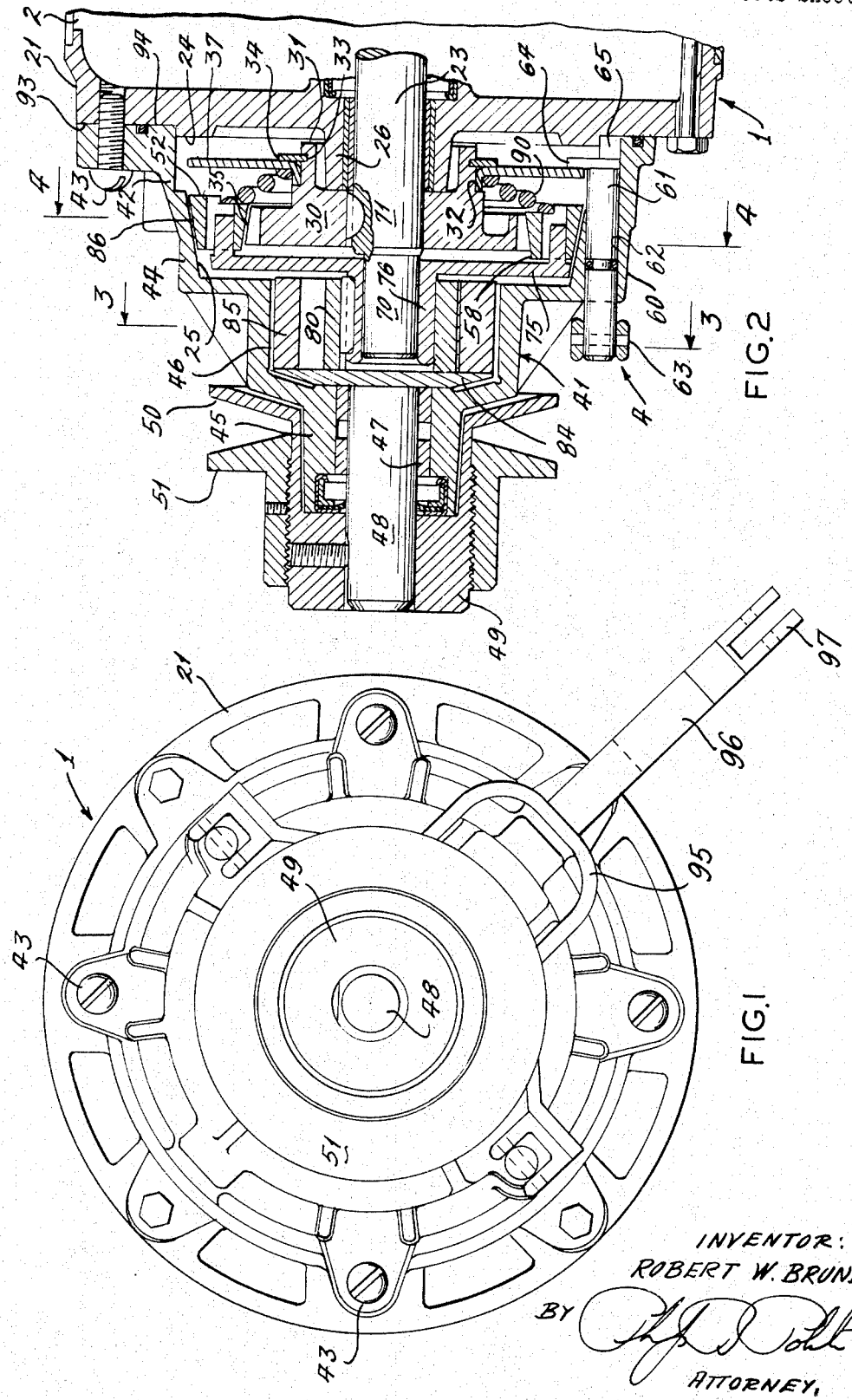

LAUNDRY EQUIPMENT POWER PACKAGE

Filed March 18, 1966  4 Sheets-Sheet 2

INVENTOR:
ROBERT W. BRUNDAGE
BY
ATTORNEY.

INVENTOR:
ROBERT W. BRUDAGE
BY
ATTORNEY.

Sept. 19, 1967 R. W. BRUNDAGE 3,342,085
LAUNDRY EQUIPMENT POWER PACKAGE
Filed March 18, 1966 4 Sheets-Sheet 4
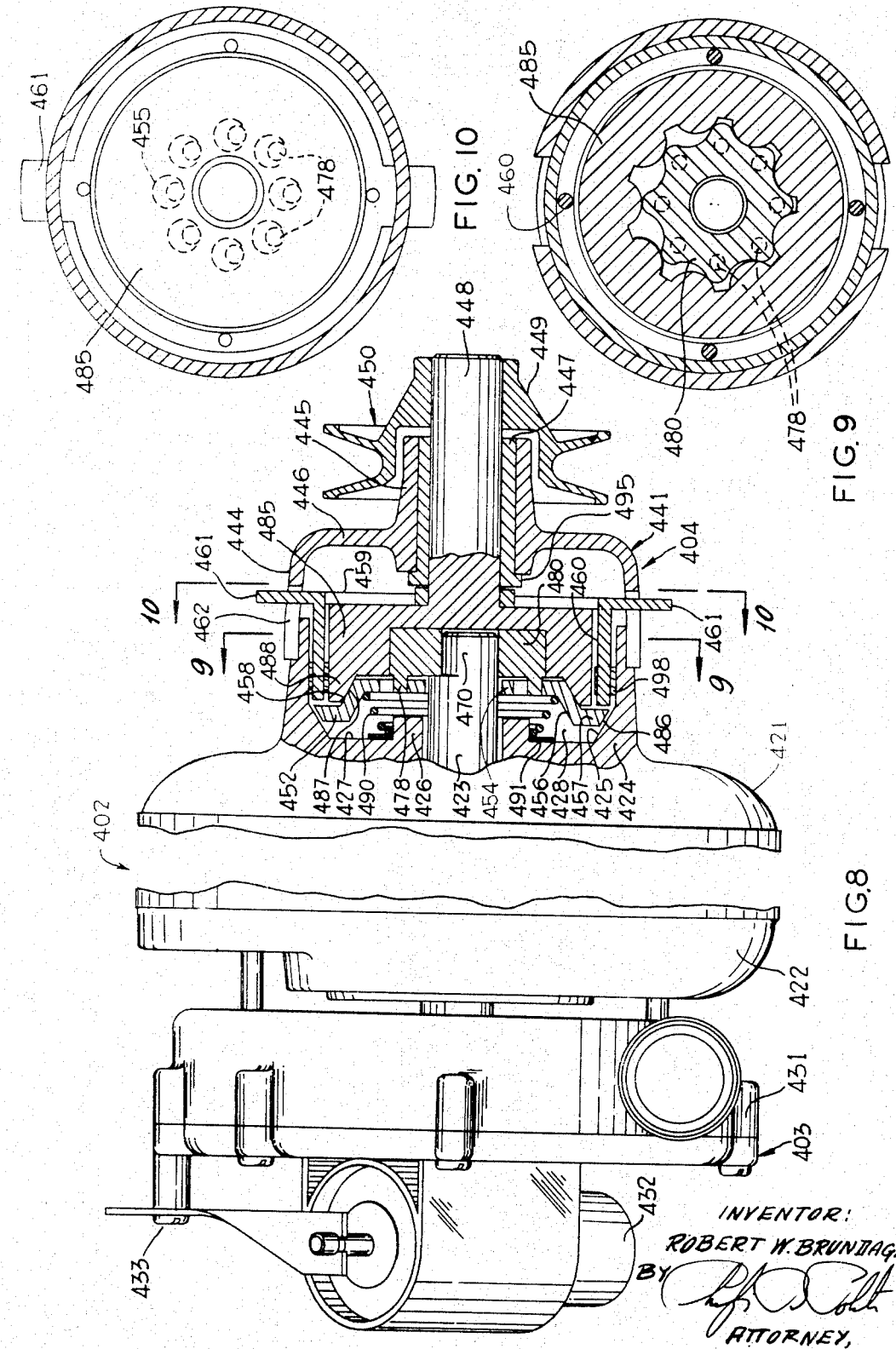
INVENTOR:
ROBERT W. BRUNDAGE
BY
ATTORNEY, United States Patent Office 3,342,085
Patented Sept. 19, 1967

3,342,085
LAUNDRY EQUIPMENT POWER PACKAGE
Robert W. Brundage, Belnor, Mo., assignor to Emerson Electric Co., St. Louis, Mo., a corporation of Missouri
Filed Mar. 18, 1966, Ser. No. 535,543
6 Claims. (Cl. 74—785)

ABSTRACT OF THE DISCLOSURE

An input shaft, an output shaft, gears driven by the input shaft and driving the output shaft, the gears include a pinion and ring gear, a fixed member for holding one of the pinion and ring gear against rotation, an axially floating clutch for selectively connecting the two gears against relative rotation, a shifter for the clutch, and a lost motion device for causing the one of the pinion and ring gears to engage the fixed member before the pinion and ring gear are disconnected from one another and to disengage from the fixed member after the pinion and ring gear are connected to one another.

This application is a continuation-in-part of my application Ser. No. 452,194 filed Apr. 30, 1965.

Background of the invention

This invention relates to laundry equipment, particularly of the character of wash machines, in which at least two speeds of operation are required. It has particular, but not exclusive, application to wash machines in which a cylindrical tub or basket is rotated about a horizontal axis.

In many parts of the world, particularly in continental Europe, the standard automatic wash machine designed to include a spin cycle, is of the horizontal type. A tub or basket, mounted for rotation on a horizontal shaft, is driven at a slow speed during the wash cycle, and a much higher speed during the spin cycle. In order to obtain these differences in speed, European wash machines particularly have been provided with multi-pole electric motors, commonly ranging from 2 pole-12 pole to 2 pole-24 pole. Such electric motors are expensive to manufacture. Their use also makes it necessary to provide a separate electric motor for a water pump.

Other methods of obtaining different speeds of rotation of the tub have been proposed, such, for example, as the use of change gears, variable speed belt drives, and the like, but these devices have heretofore proved even more expensive and space consuming that the multi-speed motors.

It has also been proposed to use planetary gears (see, for example German "Schutzanspruche" Numbers PA 117,270, Feb. 19, 1963, and PA 748,573, Oct. 24, 1964). But the arrangements of planetary gears known heretofore have either been complicated and expensive or have imposed a heavy axial thrust upon the motor shaft which necessitated the use of expensive thrust bearings.

One of the objects of this invention is to provide a laundry equipment power package which is more compact, economical to build and maintain, simple and effective than the power devices known heretofore.

Another object is to provide such a power package which may include a single speed motor to which a water pump is directly coupled.

Still another object of this invention is to provide a laundry equipment power package in which the ratio of speeds can be varied widely by the simple interchange of parts.

Other objects will become apparent to those skilled in the art in the light of the following description and accompanying drawing.

Summary of the invention

In accordance with this invention, generally stated, a laundry equipment power unit is provided which includes a transmission which has reducing gears including a pinion and a ring gear encompassing the pinion, such, for example, as an internal gear with a ring gear having a different number of teeth from the pinion, teeth of the pinion being meshed with teeth of the ring gear in one area and totally unmeshed in another area, or a planetary gear with a pinion driving revolving gears meshed with a ring gear; means for driving one of the pinion and ring gear with respect to the other; means for transmitting a rotational force from one of the ring gear and pinion while the other is held against rotation, and means for selectively connecting the pinion and ring gear together for common rotation, the means for transmitting the rotational force from one of the ring gear and pinion and for selectively connecting the ring gear and pinion together being arranged to exert no axial thrust upon the driving means.

In the preferred embodiment, the power unit includes a single speed motor and a water pump to which the motor is directly coupled.

In the preferred embodiment, the transmission has a housing and a power take off all mounted on one axial end of the motor.

Brief description of the drawing

In the drawing:
FIGURE 1 is a view in end elevation of one embodiment of power unit of this invention;
FIGURE 2 is a sectional view taken along the line 2—2 of FIGURE 1;
FIGURE 8 is a view partly in plan, partly broken away, and partly in section, showing still another embodiment of power unit of this invention, the sectional view being a longitudinal section;
FIGURE 9 is a sectional view taken along the line 9—9 of FIGURE 8;
and
FIGURE 10 is a sectional view taken along the line 10—10 of FIGURE 8.

Description of the preferred embodiments

Figure 7:
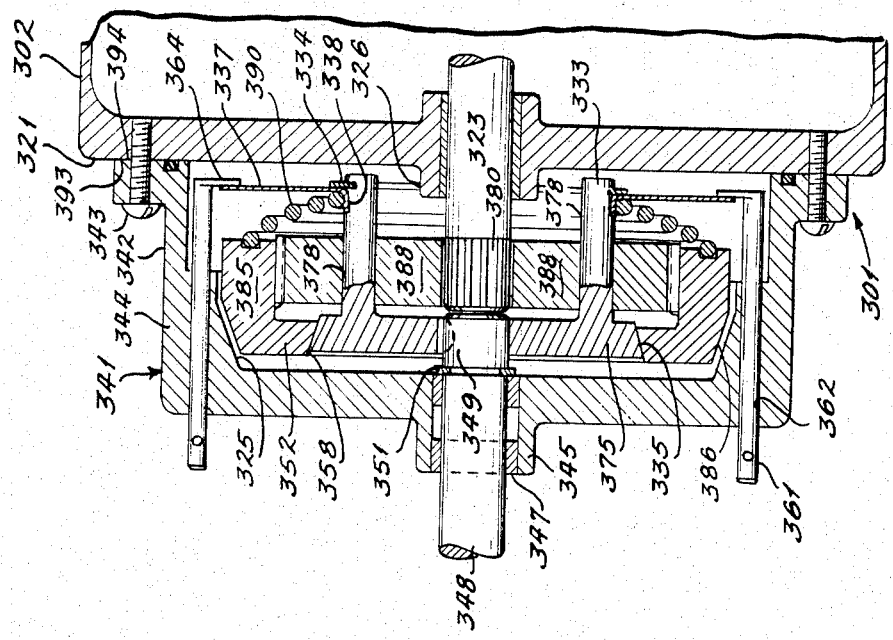
FIGURE 7 is a longitudinal sectional view of still another embodiment of power unit of this invention.

Referring now to the drawing, and particularly to FIGURES 1-4, for one illustrative embodiment of laundry equipment power package of this invention, reference numeral 1 indicates a complete package, which includes a single speed electric motor 2, a water pump such as is shown in FIGURE 8, and a transmission 4.

In each of the embodiments shown and described, the motor is a single speed fractional horse power motor. This is merely illustrative of the possibility of the use of a simple, economical motor in the laundry equipment power package of this invention. In each of the illustrative embodiments, a rear end shield is provided, on which the pump is mounted. The pump is described in greater detail in connection with the embodiment shown in FIGURES 8-10.

In the present illustrative embodiment, shown in FIGURES 1-4, an end shield 21, opposite the end shield on which the pump is mounted, is provided with an axially outwardly (from the motor) extending bearing boss 26 within which the usual type of sleeve bearing is mounted, and in which a motor shaft 23 is journalled for rotation. The end shield 21 has an annular flat face 93 on its outside surface, concentric with the shaft 23, and, radially inboard from the flat face, an annular, axially outwardly extending rib 24.

A transmission housing 41 is bolted by means of studs 43 to the end shield 21, a flat face 94 of the housing 41 butting flat against the annular flat face 93 on the end shield. An additional seal is provided by an O-ring seated in an O-ring groove in the face 94 as shown in FIGURE 2.

The housing 41 has a shifting plate section 42, a clutch section 44, a gear section 46, and a nose section 45. The housing 41 is hollow, and the inside surfaces of the various sections are concentric with the axis of rotation of the shaft 23. The shifting plate section 42 has a cylindrical inside surface; the clutch section 44 has a coned inside surface, convergent axially outwardly to form a continuous, smooth brake surface 25; the gear section 46 has a cylindrical inside surface of smaller radius than the inside surfaces of the shifting plate and clutch sections, and the nose section 45 has a cylindrical bore in which a sleeve bearing 47 is mounted. At its axially outer end, the nose section 45 is counter-bored to receive a seal, as shown in FIGURE 2. A transmission shaft 48 is journalled in the nose section bearing 47, and projects beyond the nose section 45 at each end. At its axially outer end, the shaft 48 has a hub 49 on it, with a sheave leg 50 made as part of it. Another sheave leg 51, provided with an internally threaded collar threaded onto an externally threaded section of the hub 49 is arranged for axial adjustment with respect to the sheave leg 50.

At its axially inner end, the shaft 48 is connected, by means of a web 84, to an internally toothed ring gear 85, mounted concentrically with the axes of rotation of both the transmission shaft 48 and the motor shaft 23, which are aligned, and in spaced relation to the inside surface of gear section 46 of the housing, within which it is embraced.

While the axes of rotation of the shafts 48 and 23 are aligned, the outer end of the shaft 23 is cylindrical but off-set from the axis of rotation of the shaft 23, to form a crank pin 70. Between the crank pin 70, and the axially outer end of the boss 26, is a splined clutch plate section 71 on which a clutch brake plate 30 is mounted for limited axial movement. The clutch brake plate 30 has splines or key-ways complementary to splines or keys on the clutch plate section 71 of the shaft 23, which, meshing, fix the clutch plate 30 against rotation relative to the shaft 23, but permit limited axial movement of the clutch plate 30.

Figure 4:
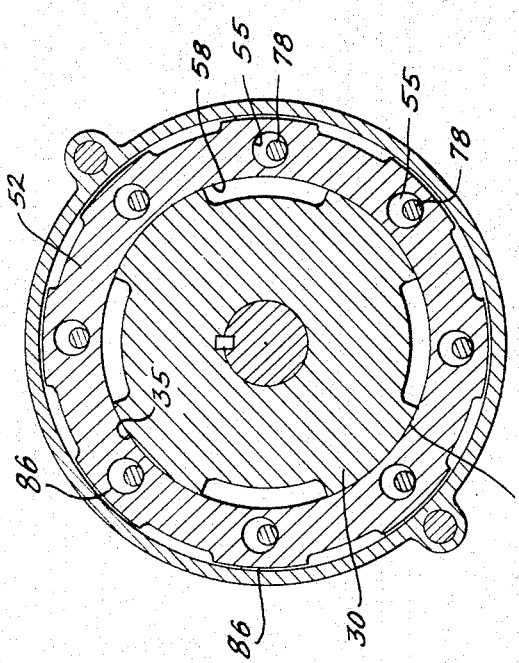
FIGURE 4 is a sectional view taken along the line 4—4 of FIGURE 2.

The clutch brake plate 30 has an integral collar 31, extending axially around the boss 26 and in spaced relation to it. The collar 31 has a stepped shoulder 32, and an annular retaining washer groove 33, in which a retaining washer 34 is mounted. The clutch brake plate 30 has a plurality of axially thick perimetric clutch faces 35, formed by interrupting the outer face of the clutch plate to decrease the amount of bearing surface it provides, as shown in FIGURE 4. The clutch faces 35 are coned divergent axially outwardly, as shown in FIGURE 2. A clutch shifter plate 37, with an axially outwardly extending annular foot which bears against the step shoulder 32, is mounted for rotation on and around the collar 31 between the step shoulder and the retaining washer 34.

A conically wound helical spring 90, has a small end bearing against the foot of the clutch shifter plate 37, and a large end which gears compressively against a clutch ring 52. The clutch ring 52 is wedge shaped in axially cross section, as shown in FIGURE 2, its inner and outer surfaces being tapered convergently axially outwardly. The outer surface of the ring 52 is interrupted to form a series of ring brake faces 86, adapted to move into and out of engagement with the uninterrupted smooth housing brake face 25. The inner surface of the ring 52 forms a smooth, uninterrupted clutching surface 58, which the clutch plate clutch faces 35 are adapted to be engaged with and released from. Holes 55 extend axially through the ring 52. In this illustrative embodiment eight such holes 55 are shown, equi-spaced about the ring. The axially inner radial face of the ring 52 is stepped to provide a seat for the axially outer end of the spring 90, as shown in FIGURE 2.

A transmission plate 75, revolvably mounted on the crank pin 70 by means of an integral bearing sleeve 76, has eight drive pins 78 projecting axially inwardly into the holes 55 in the ring 52. The drive pins 78 are spaced angularly and radially the same as the holes 55, but lie on a circle concentric with the crank pin 70, which is eccentric to the axis of rotation of the shaft 23, hence to the center of the circle on which the holes 55 lie, as shown particularly in FIGURES 2 and 4.

The outer surface of the bearing sleeve 76 has an axially extending keyway in it, in which a key is seated to mount a pinion 80.

Figure 3:
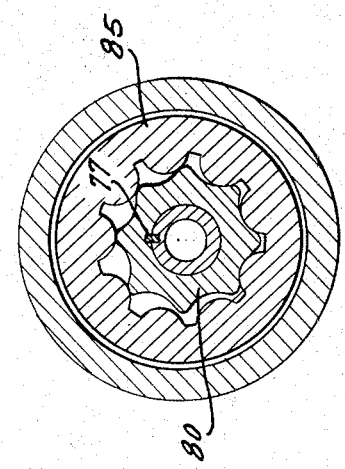
FIGURE 3 is a sectional view taken along the line 3—3 of FIGURE 2.

The pinion 80 is eccentrically mounted within the ring gear 85, and is provided with one less tooth, as shown in FIGURE 3. The pinion 80 and ring gear 85 are of the type used in hydraulic pumps and motors. At any one position of the pinion 80, one of its teeth is fully meshed with the teeth of the ring gear, the oppositely disposed tooth is fully unmeshed, and the other teeth are in some intermediate positions, all as shown in FIGURE 3.

On diametrically opposite sides of the housing 41, the housing is provided with pull rod bosses 60, each with a pull rod passage 62 extending axially through it, in which a pull rod 61 is journalled for axial movement. Within the passage 62, the pull rod 61 has an annular sealing groove, in which an O-ring is seated. At its axially outer end, the pull rod 61 has a diametric hole through it to take a yoke pin 63. On its axially inner end, the pull rod 61 has on it a shifter fork 64 extending radially inwardly, and a stop lug 65 projecting axially inwardly.

The pin 63, journalled in the passage in the outer end of each pull rod 61, is carried between legs of U-shaped brackets on the end of and integral with arms of a shifting yoke 95, from which a shift lever 96, with a clevis 97 at its outer end, extends. The yoke 95 is arranged to rock about a fulcrum, not here shown, to move the pull rods 61 axially outwardly when the shift lever 96 is moved toward the motor. The clevis 97 is connected to some power means, such as a solenoid or a hydraulic shifter, not here shown. The shifting power means forms no part of this present invention.

Ways in which the parts making up the transmission of the embodiment of power package shown in FIGURES 1–4 may be assembled are self evident from an examination of FIGURE 2. The housing is filled with lubricating oil, the circulation of which is enhanced by the passages produced by the interruption of the clutch faces 36 and 35.

In operation, assume that the transmission is in the condition shown in FIGURE 2. The pull rod 61 is in its axially inner-most position, at which there is clearance between the shifter plate 37 and the shifter fork 64. The spring 90, bearing against the ring 52, forces the ring 52 into engagement with the clutch brake surfaces 35 of the clutch plate 30. Since the clutch brake plate 30 is fixed with respect to the shifter plate 37, the clutch ring 52 is prevented from being forced by the spring 90 into engaging the brake surface 25 of the clutch housing section 44, by the engagement of the inner surface of the ring and the outer surface of the clutch brake plate 30. In this condition, the clutch ring 52 will be rotated by the shaft 23, which in turn will rotate the transmission plate 75, through the agency of the pins 78, rotating the pinion 80, which is fixed against rotation with respect to the transmission plate 75. Since the pinion 80 is locked against relative rotation with respect to the shaft 23 and crank pin 70, and is meshed with the ring gear 80, as shown in FIGURE 3, the ring gear 80, hence the shaft 48, will be rotated at the same speed as the pinion 80, i.e. at the speed of the shaft 23.

If now the shift lever 97 is rocked backwardly moving the pull rods 61 axially outwardly, the shifter forks 64 move the clutch shifter plate 37 axially outwardly, and in so doing, move the clutch brake plate 30, the spring 90, and the ring 52 axially outwardly. As this axial outward movement continues, the ring outer clutch faces 86 engage the housing clutch face 25, and the clutch plate faces 35 next, but substantially simultaneously, disengage from the ring inner clutch face 35. In this condition, the ring 52 is fixed against rotation, while the clutch plate 30 rotates freely. The transmission plate 75 is now fixed against rotation, while the pins 78 describe orbits corresponding to the eccentricity of the crank pin 70. This fixes the pinion 80 against rotation, but its eccentric motion causes the ring gear 85 to move at the rate of 1 tooth space for every revolution of the shaft 23, an 8 to 1 reduction.

It can be seen that in the condition in which there is a direct drive from the shaft 23 to the transmission shaft 48, the clutch brake plate 30, ring clutch 52, spring 90, and shifter plate 37 all rotate together, so that there is no relative movement between them. When the transmission is in the second condition, in which there is a reduction between the motor shaft 23 and the transmission shaft 48, there is relative movement between the clutch brake plate 30 and the ring 52. However, since the clutch brake plate 30 is rotating freely, being held against axial inward movement by the action of the foot of the shifter plate 37, but otherwise having no axial force exerted upon it, the clutch plate collar 31 can rotate freely within the sleeve defined by the foot 32 of the shifter plate 37, and the shifter plate 37 and spring 90 can remain motionless.

It can also be seen that since the operating forces exerted by the spring 90 are in effect self-contained between the ring and the shifter plate 37, no axial thrust is imparted to the shaft 23, the crank pin 70, or transmission shaft 48. This permits the omission of any special thrust bearings from both the motor and the transmission itself.

Figure 5:
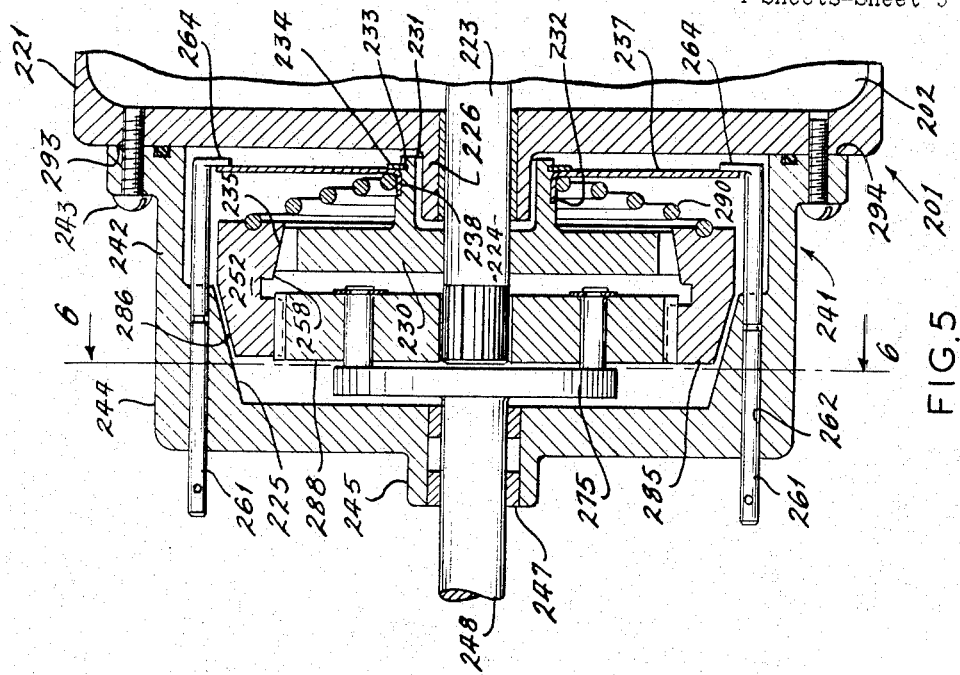
FIGURE 5 is a longitudinal sectional view of another embodiment of power unit of this invention.
Figure 6:
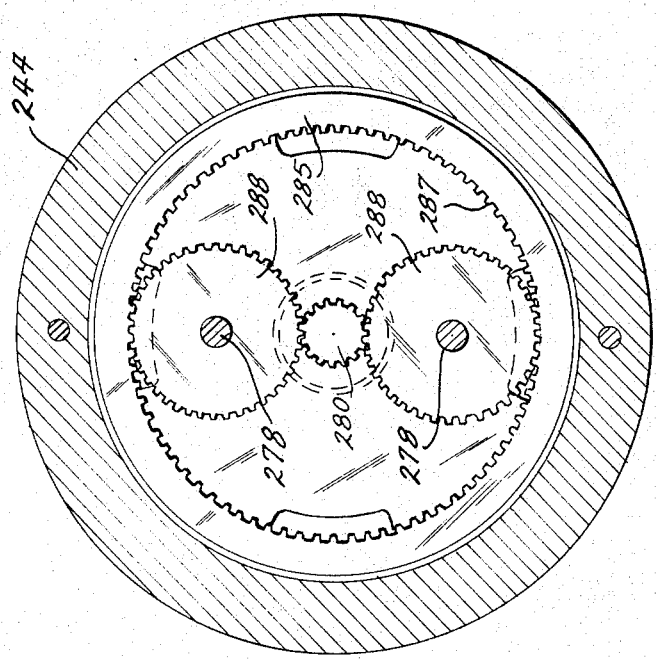
FIGURE 6 is a sectional view taken along the line 6—6 of FIGURE 5.

Referring now to FIGURES 5 and 6 for another embodiment of power package of this invention, reference numeral 201 indicates a complete package, which includes a motor 202 and a water pump such as is shown in the embodiment illustrated in FIGURES 8–10. The motor 202 has an end shield 221, with an axially outwardly extending bearing boss 226 carrying a conventional sleeve type bearing in which a motor shaft 223 is journaled, and through which it projects axially outwardly. The end shield 221 has a flat radial surface 293, concentric with the shaft 223.

A transmission housing 241 is bolted by means of studs 243 to the end shield 221, a flat face 294 of the housing 241 butting flat against the annular flat face 293 on the end shield. An additional seal is provided by an O-ring seated in an O-ring groove in the face 294, as shown in FIGURE 5.

The housing 241 has a shifting plate section 242, a clutch section 244 and an output shaft bearing boss 245, in which a sleeve bearing 247 is mounted. The motor bearing in the end shield 221 and the output shaft bearing 247 are axially aligned. The housing 241 is hollow, and the inside surfaces of the various sections are concentric with the axis of rotation of the shaft 223. The shifting plate section 242 has a cylindrical inside surface; the clutch section 244 has a coned inside surface, convergent axially outwardly to form a continuous, smooth brake surface 225.

Within the housing 241, the shaft 223 has a splined section 224, on which a clutch plate 230 is mounted for limited axial movement. The clutch plate 230 is fixed against rotation relative to the shaft 223, by means of complementary splines not here shown. The clutch plate 230 has an integral collar 231, extending axially around the boss 226 and in spaced relation to it. The collar 231 has a stepped shoulder 232, and an annular retaining washer groove 233 in which a retaining washer 234 is mounted. The clutch plate 230 has a plurality of axially thick perimetric clutch faces 235, corresponding to the clutch faces 35 of the clutch plate 30 of the embodiment shown in FIGURES 1–4. The clutch faces 235 are divergent axially outwardly, as shown in FIGURE 5. A clutch shifter plate 237, with an axially outwardly extending annular foot 238 which bears against the step shoulder 232, is mounted for rotation on and around the collar 231 between the step shoulder and the retaining washer 234. A conically wound helical spring 290, has a small end bearing against the clutch shifter plate 237 around the foot 238, and a larger end which bears compressively against a clutch brake ring section 252 of a ring gear 285.

The clutch brake ring part 252 of the ring gear 285 has an inner, axially outwardly divergently coned clutch surface 258, sloped completmentarily to the slope of the clutch plate clutch faces 235, and an outer, axially outwardly convergently coned, interrupted brake face 286, sloped complementarily to the housing clutch surface 225. The ring gear 285 also has radially inwardly projecting teeth 287, with which teeth of two planet gears 288 mesh. The teeth of the planet gears 288 also mesh with teeth on a sun gear or pinion 280 which, in this embodiment, is shown as being integral with and coaxial with the motor shaft 223.

The planet gears 288 are journaled for rotation on stub shafts 278 carried by a transmission plate 275. The planet gears 288 are restrained against axially inward movement by retaining washers on the axial inner ends of the stub shafts 278.

The transmission plate 275 is, in the embodiment shown, integral with the axially inner end of a transmission shaft 248. The shaft 248 is journaled in the bearing 247, and projects beyond the bearing at either end.

Two diametrically oppositely located axial pull-rod passages 262 extend through the housing 241. Pull-rods 261 are slidably but sealingly mounted in the passages 262, and project axially outwardly from and inwardly of the passages. At their inner ends the pull-rods 261 are provided with shifting forks 264, which extend radially inboard of and axially inward of the shifter plate 237, so as to engage the axially inner side of the shifter plate. A suitable shifting mechanism and power means are provided for moving the pull rods axially inwardly and outwardly.

Ways in which the transmission of this embodiment of power package can be assembled will be apparent to those skilled in the art from an inspection of FIGURES 5 and 6.

In the operation of this embodiment of power package, assume that the pull-rods 261 and other components are in the positions shown in FIGURE 5. The pinion 280 and ring gear 285 are connected against rotation with respect to one another through the clutch plate 230, the clutch faces 235 of which engage the clutch brake surface 258 of the clutch ring part 252 of the ring gear. The ring gear is biased axially outwardly and the clutch plate 230 axially inwardly by the spring 290, as shown clearly in FIGURE 5. In this condition, the shaft 223, shifter plate 237, spring 290, clutch plate 230, ring gear 285, planet gears 288 (which are held immovable by the pinion 280 and ring gear 285), and transmission shaft 248 all turn as one piece.

When the pull-rods 261 are moved axially outwardly, the shifter forks 264, engaging the shifter plate 237, pull the shifter plate 237 axially outwardly, first, through the agency of the spring 290, pushing the ring gear 285 to a position at which the brake faces 286 engage the brake surface 225, and, against the bias of the spring 290, next, but almost simultaneously pushing the clutch plate 230 axially away from the engagement of the clutch faces 235 with the clutch surface 258.

In this condition of the transmission, the ring gear 285 is held against rotation, and the clutch plate 230 is free to rotate independently of the ring gear 285. The planet gears 288 are driven by the pinion 280, and drive the transmission shaft 248 at a speed the reduction of which over the speed of the shaft 223 is a function of the numbers of teeth on the pinion 280 and the ring gear 285. As in the transmission of the embodiment of device shown in FIGURES 1–4, when the clutch plate 230 is free of engagement with the clutch ring, no axial force, except the negligible force required to keep it from shifting axially, is exerted upon the clutch plate, so that it can revolve freely within the sleeve defined by the foot 238 of the shifter plate 237. Again, as in the embodiment shown in FIGURES 1–4, since both the clutch plate 230 and the ring gear 285 float axially with respect to the shafts 223 and 248, no axial thrust is imparted by the clutching mechanism to either shaft.

Referring now to FIGURE 7 for a third illustrative embodiment of power package of this invention, reference numeral 301 represents a complete power package, with an electric motor 302, and a water pump, not here shown, mounted on an end shield, also not here shown, but of the same sort as the ones shown and described in conjunction with the embodiment shown in FIGURES 8–10. The motor 302 has an end shield 321, with an axially outwardly and inwardly extending boss 326 carrying a conventional sleeve type bearing in which a motor shaft 323 is journaled, and through which it projects axially outwardly. The end shield 321 has a flat radial surface 393, concentric with the shaft 323.

A transmission housing 341 is bolted by means of studs 343 to the end shield 321, a flat face 394 of the housing 341 butting flat against the annular flat face 393. An additional seal is provided by an O-ring seated in an O-ring groove in the face 394, as shown in FIGURE 7.

The housing 341 has a shifter plate section 342, a clutch section 344 and an output shaft bearing boss 345, in which an output shaft sleeve bearing 347 is mounted. The motor bearing in the end shield 321 and the output shaft bearing 347 are axially aligned. The housing 341 is hollow, and the inside surfaces of the various sections are concentric with the axis of rotation of the shaft 323. The shifter plate section 342 has a cylindrical inside surface; the clutch section 344 has a coned inside surface, convergent axially outwardly to form a continuous, smooth brake surface 325.

Within the housing 341, the shaft 323 has at its axially outer end a pinion 380 concentric with and, in this illustrative embodiment, integral with the shaft 323.

Two planet gears 388, corresponding with the planet gears 288 of the embodiment shown in FIGURES 5 and 6, mesh with the pinion 380, and also with a ring gear 385. The planet gears 388 are journaled for rotation on stub shafts 378, carried by a transmission plate 375. The transmission plate 375 is, in turn, mounted for limited axial movement on a splined inner end 349 of an output shaft 348, journaled in the output shaft bearing 347. In this embodiment, the output shaft 348 is provided with an annular channel, in which a retaining washer 351 is mounted to prevent the shaft's being pulled out of the housing.

The transmission plate 375 has a plurality of axially thick perimetric clutch faces 335, corresponding to the clutch faces 35 of the clutch face 30 of the embodiment shown in FIGURES 1–4. The clutch faces 335 are divergent axially outwardly. A clutch brake ring part 352 of the ring gear 385 has an inner axially outwardly divergently coned clutch surface 358, sloped complementarily to the slope of the transmission plate clutch faces 335. The clutch surface 358 is smooth and continuous.

The axially and radially outer surface of the ring gear 385 is chamfered annularly and cut away in part to provide a plurality of ring gear brake faces 386, corresponding in appearance to the brake faces 86 shown in FIGURE 4. The slope of the brake faces 386 is complementary to the slope of the housing brake surface 325.

A helically wound spiral spring 390 bears with its outer, large end, on the bottom of a retaining groove in the axially inner radial face of the ring gear 385. The small end of the spring 390 bears against a clutch shifter plate 337, around an annular foot 338 of the clutch shifter plate. The foot 338 of the shifter plate 337 is rotatably mounted in a channel defined by a step in the radially outer side of each stub shaft 378 and a retaining washer 334 mounted in a groove 333 in the radially outer surface of the stub shafts, as shown in FIGURE 7.

Two, diametrically oppositely located, axial pull-rod passages 362 extend through the housing 341. Pull-rods 361 are slidably but sealingly mounted in the passages 362, and project axially outwardly from and inwardly of the passages. At their inner ends, the pull-rods 361 are provided with shifting forks 364, which extend radially inboardly and axially inwardly of the shifter plate 337, so as to engage the axially inner radial side of the shifter plate. A suitable shifting mechanism and power means are provided for moving the pull-rods axially inwardly and outwardly.

Ways in which the transmission of this embodiment of power package can be assembled will be apparent to those skilled in the art from an inspection of FIGURE 7.

In the operation of this embodiment of power package, assume that the pull-rods 361 and other components are in the positions shown in FIGURE 7. The pinion 380 and ring gear 385 are connected against rotation with respect to one another by virtue of the fact that planet gears 388 cannot rotate with respect to the ring gear 385, because the ring gear 385 and transmission plate, biased in opposite directions by the spring 390, are frictionally held together by the clutch surfaces 358 and 335. As in the other embodiments, the fact that the ring gear 385 and the transmission plate 375 float axially with respect to the motor shaft 323 and output shaft 348, ensures that no axial thrust is exerted on either of those shafts.

When the pull-rods 361 are moved axially outwardly, the forks 364 pull the shifter plate 337, and with it, the ring gear 385 and transmission plate 375, until the brake faces 386 of the ring gear engage the brake surface 325 of the housing. As the axially outward movement continues, the clutch faces 335 of the transmission plate break away from the clutch surface 358 of the ring gear, freeing the planet gears 388 for rotation with respect to the ring gear 385 which is held against rotation by the engagement of the brake faces 386 and the brake surface 325. In this condition, the transmission plate 375 will turn slowly, the ratio of its speed to that of the shaft being dependent upon the relative numbers of the teeth on the pinion and ring gear. Again, as in the other embodiments described heretofore, the transmission plate is free to rotate, and exerts no appreciable axial thrust on the shifter plate 337 once the transmission plate 375 has been freed from the ring gear clutch brake section 352. In any case, no axial thrust is imparted to the motor shaft 323 or output shaft 348.

Referring now to FIGURES 8, 9 and 10 for still another embodiment of power package of this invention, reference numeral 402 indicates a single speed motor with end shields 421 and 422, on the latter of which is mounted a water pump 403 with a casing 431, a solenoid 432 and a valve 433 in a drain line between a washing machine, not here shown, and a suction side of the pump 403. An impeller within the casing 431 is keyed to a motor shaft 423.

At the other end of the motor 402 from the water pump 403 is a transmission 404.

The end shield 421 has integral with it an outwardly axially projecting annular wall 424. The wall 424 has radially outer and inner faces both of which are concentric with the axis of rotation of the motor shaft 423. The wall 424 is rabbeted at its radially outer axially outer end, to receive the axially inner edge of a transmission housing 441.

The wall 424, a bottom wall 427, and a bearing boss 426 define a spring receiving well 428.

Contiguous bottom fall 427, the radially inner surface of the wall 424 is coned divergently axially outwardly to form a conical braking surface 425. A guide rib 498 extends around the inner surface of the wall 424 above the coned surface 425. The guide ring 498 has axial passages through it, adapted to admit control pins 460. The control pins 460 are integral at their axially outer ends with a control ring 459, from which tabs 461 project radially through slots 462 in the housing 441.

The transmission housing 441 includes a body portion 444, within which the slots 462 are, a nose section 445, of smaller diameter than the body section 444, and within which is mounted a sleeve bearing 447, and connecting web 446 extending between the body portion 444 and the nose section 445. The bearing sleeve 447 has a radially extending flange 495 integral with it and extending beyond the axially inner end of the nose section 445. A shaft 448 is journaled for rotation within the bearing 447. At its axially outer end, the shaft 448 has keyed to it a hub 449 of a sheave 450.

At its axially inner end, the shaft 448, in this embodiment, is integral with a ring gear 485. The ring gear 485 is concentric with the axis of rotation of the shaft 448 and of the motor shaft 423, with which the shaft 448 is axially aligned. The radial outer surface of the ring gear 485 is cylindrical throughout its axial length. The ring gear 485 has on its axially inner radial surface an annular boss 488. The radially inner surface of the boss 488 is chamfered divergently axially inwardly, to form a clutching surface 487.

A transmission clutch-brake plate 452 is mounted within the compass of the wall 424 between the bottom wall 427 and the ring gear 485. The transmission clutch-brake plate 452 is inverted dish shaped, with a hole in a central web 454 to accommodate the shaft 423 around which it is spacedly mounted, holes 455 in the web 454, a side section 456 and a lip section 457. The axially outer surface of the side section 456 is coned convergently axially outwardly, complementarily to the clutching surface 487 of the ring gear, to provide a clutching surface 458. The radially outer edge of the lip 457 is chamfered to form a braking surface 486 complementary to the coned surface 425 of the wall 424. As in the embodiment shown in FIGURES 1–4, the shaft 423 is formed with a crank pin 470, cylindrical and axially parallel with but offset from the axis of rotation of the shaft 423. A pinion 480 is mounted for rotation on the crank pin 470, and is provided on its axially inner radial surface with integral drive pins 478. The drive pins 478 extend axially into the holes 455 in the transmission clutch-brake plate 452.

A spring 490 is mounted with its axially outer turn bearing against the transmission clutch-brake plate 452 at the arris between the center section 454 and the side 456, and with its axially inner turn embracing the boss 426 and resting against thrust washers 491.

In operation, in the condition of the transmission shown in FIGURE 8, the transmission plate 452 is biased by the spring 490 to a position in which the clutching surface 458 is in frictional engagement with the clutching surface 487 of the ring gear. In this condition, the ring gear is connected with the pinion 480, through the pins 478, and the ring gear is driven at the same rate as the pinion 480, which, by virtue of the fact that the pinion 480 cannot rotate with respect to the crank pin 470, is the same speed as the shaft 423.

When the tabs 461 are moved axially inwardly by power means, not here shown, the pins 460 bear on the axially outer radial surface of the lip 457, moving the transmission clutch-brake plate 452 out of engagement with the ring gear and into a poistion in which the clutching face 486 of the transmission plate frictionally engages the coned surface 425 of the fixed wall 424. This engagement holds the transmission clutch-brake plate 452 from rotation, and causes the pinion 480 to undulate as the crank pin 470 rotates. The undulation of the pinion 480 causes the ring gear 485 to rotate at a rate of one-ninth of a revolution per revolution of the shaft 423.

The laundry equipment for which the power package of this invention is designed, is conventional, and has not been shown. It is to be understood that in the embodiments shown the belt-engaging part of the sheave drives a belt which in turn drives a sheave mounted on the clothes container (tub)-rotating shaft of the laundry equipment. This is merely illustrative. Any kind of conventional drive may be employed between the transmission shaft and the tub, including gears or even a direct drive from the transmission shaft.

Numerous other variations in the construction of the device of this invention, within the scope of the appended claims will occur to those skilled in the art in the light of the foregoing disclosure. It can be seen, for example, that the use of a two speed motor, while being of less utility as respects the water pump, provides a four speed transmission; different housing arrangements, crank pin and shifting arrangements can be used; one or a multiplicity of planet gears may be employed; other mounting means beside the stub shafts, carried by the transmission plate of the embodiment shown in FIGURE 7, can be used to support the shifter plate, as long as they do not interfere with the turning of the planet gears; the clutch surfaces can all be made smooth and continuous, or reversed as far as discontinuity is concerned, and other possible reversals of parts will be evident to those skilled in the art. These are merely illustrative.

Having thus described the invention, what is claimed and desired to be secured by Letters Patent is:

1. A wash machine power unit comprising a single speed electric motor having an axially directed motor input shaft, a plural speed transmission having a housing and a single power take-off all mounted on said motor at one axial end of said shaft and operatively connected thereto, said power take-off including an output shaft connected to drive wash and spin elements of a wash machine and means, within said transmission, for changing the speed of said power take-off relative to the speed of said shaft, said transmission including: a pinion driven by the input shaft; a ring gear, the pinion being concentric with the input shaft and ring gear and meshed with at least one planet gear which in turn is meshed with said ring gear, said planet gear being connected to a transmission plate mounted for axial movement and against relative rotation on the output shaft, said transmission plate having a peripheral sloped clutch face, the ring gear having a clutch-brake ring part having an inner clutch surface sloped complementarily to the transmission clutch face and an outer, annularly chamfered, brake surface; a brake surface on the fixed housing, said housing brake surface having a slope complementary to the annularly chamfered brake surface of the ring gear; a shifter plate rotatably mounted on means carried by the transmission plate, and a spring mounted compressively between and against the ring gear and transmission plate.

2. A power package transmission system comprising an input shaft; an output shaft; gear means adapted to be driven by said input shaft and to drive said output shaft, said gear means including a pinion and a ring gear; fixed means independent of said shafts positioned and arranged selectively to engage with one of said pinion and ring gear to hold it against rotation; clutch-brake means, axially floatingly arranged with respect to the shafts and the fixed means for selectively connecting the ring gear and pinion against rotation relative to one another or producing the engagement of one of said pinion and ring gear with the fixed means, and including a lost motion connection for causing the said one of the pinion and ring gear to engage the said fixed means before the said pinion and ring gear are disconnected from one another, and to disengage from said fixed means after said pinion and ring gear are connected to one another, and shifter means for moving said clutch-brake means between ring gear and pinion connected position and ring gear and pinion disconnected position.

3. The system of claim 2 wherein the lost motion connection includes a spring.

4. The system of claim 3 wherein the pinion is mounted on a crank pin part of the input shaft and the ring gear is connected to and concentric with the output shaft, and the pinion and ring gear are in direct contact and have different numbers of teeth fully meshed in one area and fully unmeshed in another, said pinion being mounted for eccentric rotation with respect to said ring gear, said pinion being connected to a transmission plate coupled to a clutch ring forming part of the clutch means, said fixed means being a housing with a brake surface complementary to a brake surface on the clutch ring and said clutch means including, in addition to said ring, a clutch plate having a coned clutching surface of a slope opposite the housing clutching surface and adapted to engage a complementary clutch ring inner clutching surface, said clutch plate having a collar and being mounted on and for axial movement with respect to the input shaft, and a shifter plate rotatably mounted on said clutch plate collar; and wherein the lost motion spring is mounted between and bearing upon the clutch ring and shifter plate.

5. The system of claim 3 wherein the pinion is concentric with the input shaft and ring gear and is meshed with at least one planet gear which in turn is meshed with said ring gear, said planet gear being connected to a transmission plate connected to the output shaft; wherein the ring gear has a clutch brake ring part provided with an inner coned clutch surface and an outer, annularly chamfered brake surface; wherein the fixed means is a brake surface of a fixed housing, said housing brake surface having a slope complementary to the annular, chamfered surface of the ring gear; wherein a clutch plate is provided, having a peripheral clutch face sloped complementarily to the inner clutch surface of the ring gear, said clutch plate being mounted for axial movement and against relative rotation on the input shaft and carrying a shifter plate, and the spring is mounted compressively between the shifter plate and the ring gear, said ring gear being axially floatingly mounted with respect to both input and output shafts.

6. The system of claim 3 wherein the pinion is concentric with the input shaft and ring gear and is meshed with at least one planet gear which in turn is meshed with said ring gear, said planet gear being connected to a transmission plate mounted for axial movement and against relative rotation on the output shaft, said transmission plate having a peripheral sloped clutch face; wherein the ring gear has a clutch brake ring part having an inner clutch surface sloped complementarily to the transmission clutch face and an outer, annularly chamfered brake surface; wherein the fixed means is a brake surface of a fixed housing, said housing brake surface having a slope complementary to the annularly chamfered surface of the ring gear; and wherein a shifter plate is rotatably mounted on means carried by the transmission plate and the spring is mounted compressively between and against the ring gear and transmission plate.

References Cited
UNITED STATES PATENTS

| | | | |
|---|---|---|---|
| 894,473 | 7/1908 | Symmonds | 74—769 |
| 1,310,530 | 7/1919 | Johanson | 74—769 |
| 1,404,081 | 1/1922 | Auvil | 74—785 |
| 1,588,602 | 6/1926 | Midgley | 74—785 |
| 2,097,021 | 10/1937 | De Normanville | 74—781 |
| 2,136,971 | 11/1938 | Fleischel | 74—781 X |
| 2,399,319 | 4/1946 | Bowen et al. | 74—785 |
| 2,429,509 | 10/1947 | Breckenridge | 74—785 X |
| 2,612,034 | 10/1952 | Constantine | 68—24 X |
| 2,836,046 | 5/1958 | Smith | 74—785 X |
| 2,842,002 | 7/1958 | Stegman | 68—24 |

DONLEY J. STOCKING, *Primary Examiner.*

DAVID J. WILLIAMOWSKY, *Examiner.*

J. R. BENEFIEL, *Assistant Examiner.*